United States Patent
Tanaka (10) Patent No.: US 11,262,499 B2
(45) Date of Patent: Mar. 1, 2022

(54) WAVELENGTH CHECKER

(71) Applicant: Nippon Telegraph and Telephone Corporation, Tokyo (JP)

(72) Inventor: Takuya Tanaka, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/280,397

(22) PCT Filed: Oct. 15, 2019

(86) PCT No.: PCT/JP2019/040415
§ 371 (c)(1),
(2) Date: Mar. 26, 2021

(87) PCT Pub. No.: WO2020/090433
PCT Pub. Date: May 7, 2020

(65) Prior Publication Data
US 2021/0356665 A1 Nov. 18, 2021

(30) Foreign Application Priority Data
Oct. 29, 2018 (JP) .............................. JP2018-202532

(51) Int. Cl.
*G02B 6/12* (2006.01)
*G02B 6/13* (2006.01)

(52) U.S. Cl.
CPC ............ *G02B 6/12011* (2013.01); *G02B 6/13* (2013.01)

(58) Field of Classification Search
CPC ................................................ G02B 6/12011
See application file for complete search history.

(56) References Cited

U.S. PATENT DOCUMENTS

| | | | | |
|---|---|---|---|---|
| 5,820,265 A * | 10/1998 | Kleinerman | ............... | G01J 5/52 374/137 |
| 7,684,695 B1 * | 3/2010 | Uhlhorn | ............. | H04B 10/0771 398/10 |
| 10,047,659 B2 * | 8/2018 | Salter | .................... | G09F 3/0294 |
| 2003/0007728 A1 * | 1/2003 | Uetsuka | ............. | G02B 6/12011 385/37 |

(Continued)

FOREIGN PATENT DOCUMENTS

JP H10104446 A 4/1998

OTHER PUBLICATIONS

Takahashi et al., "Arrayed-waveguide grating for WDM systems," NTT R&D, vol. 46, No. 7, 1997, pp. 685-692 (17 total pages with English Translation).

(Continued)

*Primary Examiner* — Eric Wong
(74) *Attorney, Agent, or Firm* — Slater Matsil, LLP (57) ABSTRACT

An arrayed waveguide, an input-side slab waveguide, an output-side slab waveguide, an input waveguide, and an output waveguide are included. Provided are a groove formed to extend in a direction crossing a plurality of the output waveguides, and an optical conversion unit made of a conversion material that converts near-infrared light to visible light, the groove being filled with the optical conversion unit. The conversion material is, for example, a phosphor or fluorescent substance that converts near-infrared light to visible light.

16 Claims, 9 Drawing Sheets

(56) References Cited

U.S. PATENT DOCUMENTS

| | | | | |
|---|---|---|---|---|
| 2009/0016716 A1* | 1/2009 | Ishida | ............... | H04B 10/0795 |
| | | | | 398/38 |
| 2010/0008676 A1* | 1/2010 | Kojima | ................. | G02B 6/424 |
| | | | | 398/141 |
| 2016/0009991 A1* | 1/2016 | Kaide | ............... | C09K 11/7774 |
| | | | | 257/98 |
| 2018/0299705 A1* | 10/2018 | Schmidt | ................. | G02F 1/009 |
| 2019/0133502 A1* | 5/2019 | Gomi | .................. | A61B 5/1455 |

OTHER PUBLICATIONS

Takahashi et al., "Transmission Characteristics of ArrayedWaveguide N × N Wavelength Multiplexer," Journal of Lightwave Technology, vol. 13, No. 3, Mar. 1995, pp. 447-455.

Homa et al., "Standardization trends for further speeding up ofPON systems," NTT Technology Journal, Aug. 2017, pp. 51-53 (7 total pages with English Translation).

\* cited by examiner

WAVELENGTH CHECKER

CROSS-REFERENCE TO RELATED APPLICATIONS

This application is a national phase entry of PCT Application No. PCT/JP2019/040415, filed on Oct. 15, 2019, which claims priority to Japanese Application No. 2018-202532, filed on Oct. 29, 2018, which applications are hereby incorporated herein by reference.

TECHNICAL FIELD

The present invention relates to a wavelength checker, and more specifically, to a wavelength checker that checks for example signal light in opening and failure isolation investigation of a PON system.

BACKGROUND

In an access-type passive optical network (PON) system of an optical communication system, a plurality of light beams having relatively distant wavelengths such as a wavelength of 1.3 µm and a wavelength ranging from 1.5 to 1.6 µm may be used at the same time.

According to Non Patent Literature 1, in a GE-PON (G-PON) system that has already been introduced, a wavelength ranging from 1260 nm to 1360 nm (only a regular band is described in G-PON) is used as a signal from a user to a station (an uplink signal). Further, in a G-PON system, a wavelength ranging from 1480 nm to 1500 nm is used as a signal (a downlink signal) from a station to a user, and a wavelength ranging from 1550 nm to 1560 nm is used as a downlink video signal.

Figure 12:
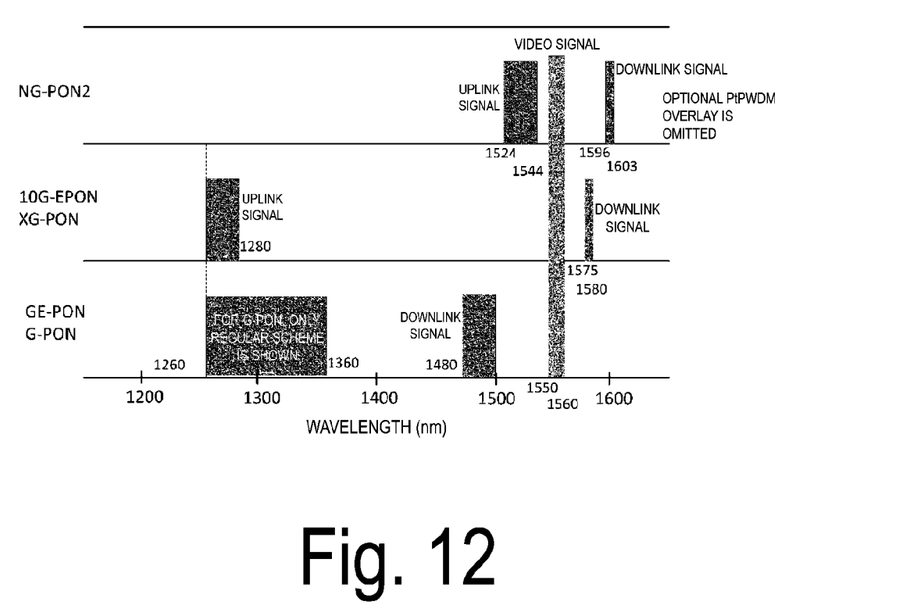
FIG. 12 is an illustrative diagram illustrating a relationship between wavelength allocation of NG-PON 2, 10G-EPON (XG-PON), and GE-PON (G-PON).

Similarly, in a 10G-EPON (XG-PON) system, which is scheduled to be introduced in the future, a wavelength of 1.3 µm and a wavelength ranging from 1.5 to 1.6 µm are used. In an NG-PON2 system, which has been standardized recently, a wavelength ranging from 1524 nm to 1544 nm (a wide band) is used for an uplink signal, a wavelength ranging from 1596 nm to 1603 nm is used for a downlink signal, and a wavelength ranging from 1550 nm to 1560 nm is used for a downlink video signal. Description of an optional point to point wavelength division multiplex (PtPWDM) overlay is omitted. In this system, wavelength multiplexing is performed, unlike GE-PON (G-PON) and 10G-EPON (XG-PON). These wavelength allocation is illustrated in FIG. 12.

Incidentally, in a PON system such as GE-PON, optical power is checked in an opening test. In the future, more various wavelengths will be used in a transition from GE-PON to 10G-EPON. In a test in such a situation, when a wavelength can be determined, a type of signal can be discriminated, failure can be easily isolated, and work efficiency is likely to be improved.

CITATION LIST

Patent Literature

Patent Literature 1: JP 10-104446 A

Non Patent Literature

Non Patent Literature 1: Ryo Koma et al., "Standardization Activities Regarding Speedup of PON System," NTT Technology Journal, August 2017, pages 51-53.

Non Patent Literature 2: Hiroshi Takahashi et al., "Arrayed waveguide diffraction grating for WDM," NTT R&D, vol. 46, no. 7, pp. 685-692, 1997.

Non Patent Literature 3: H. Takahashi et al., "Transmission Characteristics of Arrayed Waveguide N×N Wavelength Multiplexer," Journal of Light Technology, vol. 13, no. 3, pp. 447-455, 1995.

SUMMARY

Technical Problem

Incidentally, examples of means for measuring a wavelength include an optical spectrum analyzer. However, because the optical spectrum analyzer includes a movable part for allowing a detector to detect diffracted light obtained through movement of a diffraction grating, a device is large and heavy, and thus is poor in portability. Further, there is also a drawback that a power supply for a relatively high voltage of about 100 V is required. Thus, in the related art, there is a problem that it is not possible to easily check for example whether signal light is coming in opening and failure isolation investigation of a PON system.

Embodiments of the present invention have been made in order to solve the above problem, and an object of embodiments of the present invention is to check for example whether there is signal light in opening, failure isolation investigation, or the like of a PON system to be easily performed.

Means for Solving the Problem

A wavelength checker according to embodiments of the present invention includes an arrayed waveguide including a plurality of waveguides formed on a substrate, each of the plurality of waveguides including a cladding portion and a core, the plurality of waveguides including a plurality of waveguides having a constant optical path length difference; an input-side slab waveguide formed on the substrate and connected to an optical input end of the arrayed waveguide; an output-side slab waveguide formed on the substrate and connected to an optical output end of the arrayed waveguide; an input waveguide formed on the substrate and connected to an input side of the input-side slab waveguide; a plurality of output waveguides formed on the substrate and connected to an output side of the output-side slab waveguide; a groove configured to extend in a direction crossing the plurality of output waveguides, the groove being formed in cladding portions of the plurality of output waveguides; and an optical conversion unit made of a conversion material that converts near-infrared light to visible light, the groove being filled with the optical conversion unit.

In one configuration example of the wavelength checker, the input-side slab waveguide, the arrayed waveguide, and the output-side slab waveguide are formed so that a shape in a plan view is line-symmetrical with respect to a straight line that passes through a midpoint of a line segment connecting a center of the input-side slab waveguide to a center of the output-side slab waveguide and that is perpendicular to the line segment, the input waveguide includes a first input waveguide and a second input waveguide, and when a waveguide interval in a connection portion of the plurality of output waveguides with the output-side slab waveguide is $\Delta x_{out}$, a waveguide interval between a connection portion of the first input waveguide with the input-side slab waveguide and a connection portion of the second input waveguide with the input-side slab waveguide is $\Delta x_{out}/2$.

In an example of a configuration of the wavelength checker, the conversion material is a phosphor or fluorescent substance that converts near-infrared light to visible light.

Effects of Embodiments of the Invention

As described above, according to embodiments of the present invention, the groove extending in the direction crossing the plurality of output waveguides is provided, and the optical conversion unit made of the conversion material that converts the near-infrared light to the visible light is formed such that the groove is filled with the optical conversion unit. Thus, it is possible to easily check for example whether there is signal light in opening, failure isolation investigation, or the like of a PON system.

DETAILED DESCRIPTION OF ILLUSTRATIVE EMBODIMENTS

Hereinafter, a wavelength checker according to an embodiment of the present invention will be described.

First Embodiment

Figure 1:
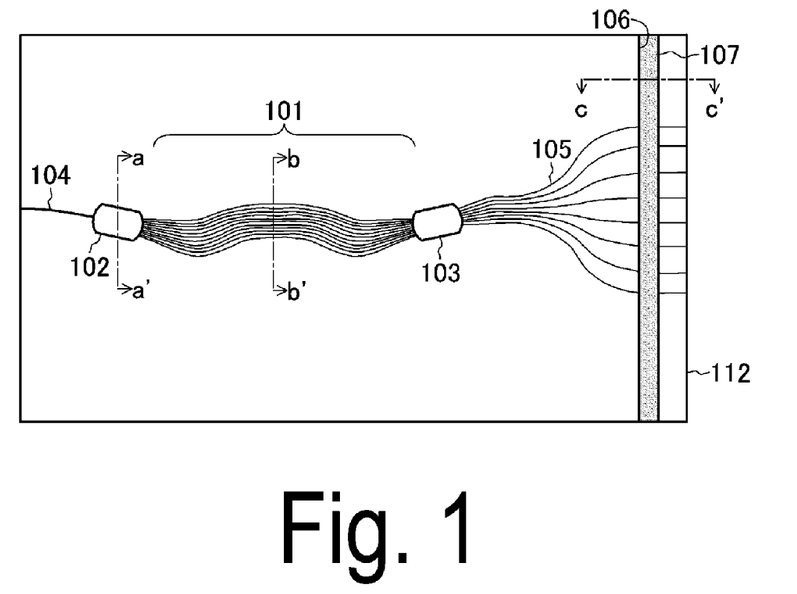
FIG. 1 is a configuration diagram illustrating a configuration of a wavelength checker according to a first embodiment of the present invention.

First, a wavelength checker according to the first embodiment of the present invention will be described with reference to FIG. 1. This wavelength checker includes an arrayed waveguide 101, an input-side slab waveguide 102, an output-side slab waveguide 103, an input waveguide 104, and an output waveguide 105. FIG. 1 a plan view of the wavelength checker.

The arrayed waveguide 101 includes a plurality of waveguides having a constant optical path length difference. In the arrayed waveguide 101, the optical path length difference between two adjacent waveguides is constant. The input-side slab waveguide 102 is connected to an optical input end of the arrayed waveguide 101. The output-side slab waveguide 103 is connected to an optical output end of the arrayed waveguide 101. The input waveguide 104 is connected to an input side of the input-side slab waveguide 102. A plurality of the output waveguides 105 are provided and connected to an output side of the output-side slab waveguide 103. The arrayed waveguide 101, the input-side slab waveguide 102, the output-side slab waveguide 103, the input waveguide 104, and the output waveguide 105 constitute a known arrayed waveguide grating (see Patent Literature 1).

The wavelength checker includes a groove 106 that extends in a direction crossing the plurality of output waveguides 105 and is formed in cladding portions of the output waveguides 105, and an optical conversion unit 107 made of a conversion material with which the groove 106 is filled and which converts near-infrared light to visible light. The groove 106 is formed in the cladding portions of the output waveguides 105 with cores of the output waveguides 105 divided.

The conversion material is, for example, a phosphor or a fluorescent substance that converts near-infrared light to visible light. The conversion material is mixed with, for example, a thermosetting silicone resin, the groove 106 is filled with a resultant mixture, and the mixture is heated and cured to form the optical conversion unit 107. For example, a phosphor manufactured by "Lumitek International" can be used. For example, there is a conversion material having a sensitivity between 700 nm and 1700 nm.

According to the wavelength checker of the first embodiment, when the near-infrared light demultiplexed into each wavelength by the arrayed waveguide grating and guided through the output waveguides 105 reaches the optical conversion unit 107, visible light is generated. The generated visible light spreads isotropically, not limited to a waveguide direction of each output waveguide 105, and can be viewed from various directions. Because a wavelength of the near-infrared light that is divided and guided in each output waveguide 105 is known, it is possible to determine the wavelength by observing a place at which visible light has been generated (is visible).

Figure 2A:
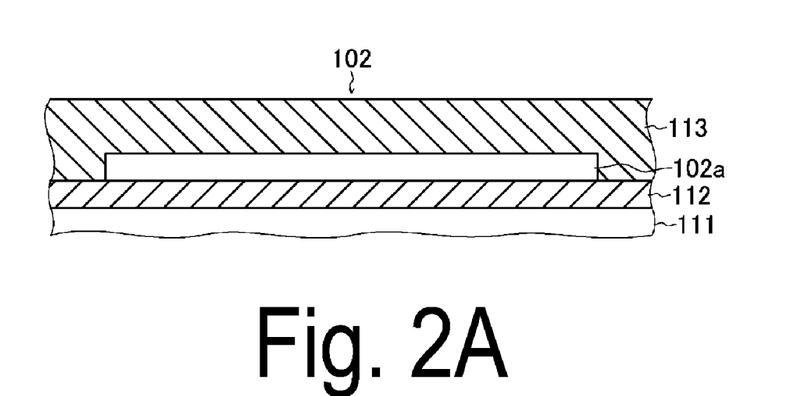
FIG. 2A is a sectional view illustrating a partial configuration of the wavelength checker according to the first embodiment of the present invention.

Here, the input-side slab waveguide 102 includes a lower cladding layer 112 formed on a substrate 111 made of, for example, Si, a core portion 102a formed on the lower cladding layer 112, and an upper cladding layer 113 formed on the core portion 102a, as illustrated in FIG. 2A. FIG. 2A illustrates a cross section taken along line a-a' in FIG. 1.

Figure 2B:
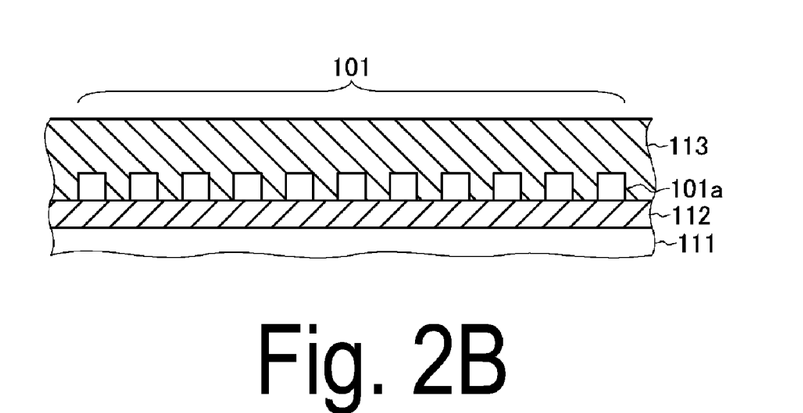
FIG. 2B is a sectional view illustrating a partial configuration of the wavelength checker according to the first embodiment of the present invention.

Further, the arrayed waveguide 101 includes a lower cladding layer 112 formed on a substrate 111, a plurality of core portions 101a formed on the lower cladding layer 112, and an upper cladding layer 113 formed on the plurality of core portions 101a, as illustrated in FIG. 2B. FIG. 2B illustrates a cross section taken along line b-b' of FIG. 1.

Figure 2C:
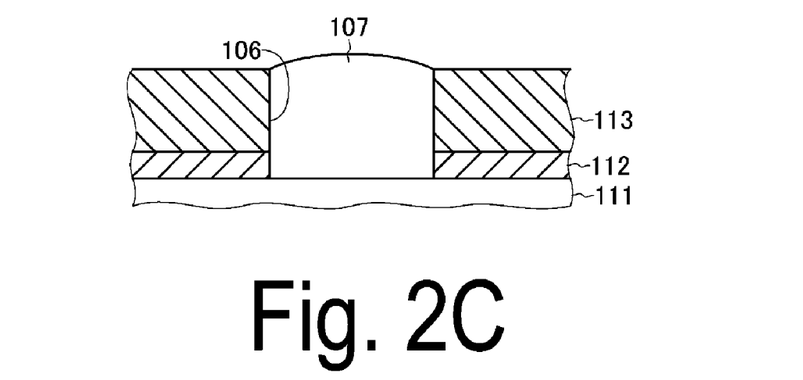
FIG. 2C is a sectional view illustrating a partial configuration of the wavelength checker according to the first embodiment of the present invention.

Further, the groove 106 is formed to reach the substrate 111 such that the output waveguides 105 are divided, as illustrated in FIG. 2C. Thus, the optical conversion unit 107 is formed to fill the groove 106 formed to penetrate the upper cladding layer 113 and the lower cladding layer 112. FIG. 2C illustrates a cross section taken along line c-c' of FIG. 1.

The arrayed waveguide grating will be described herein in more detail. Hereinafter, a case in which the arrayed waveguide 101 includes eight waveguides, and eight output waveguides 105 are provided will be described by example (FIG. 1 illustrates that the arrayed waveguide 101 includes eleven waveguides, but the arrayed waveguide 101 includes more waveguides in practice). In this arrayed waveguide grating, multiplexed light having eight wavelengths input to the input waveguide 104 is branched into eight outputs.

First, the multiplexed light input to the input waveguide 104 is diffracted and spread by the input-side slab waveguide 102, and the light is coupled to the respective waveguides of the arrayed waveguide 101 and guided. In the arrayed waveguide 101, an optical path length is long on the upper side of a paper surface of FIG. 1 (the outer side), and each optical path length is gradually shortened by an equal distance toward the lower side of the paper surface of FIG. 1 (the inner side). At an output end of the arrayed waveguide 101, there is a phase difference from the waveguide on the outer side toward the waveguide on the inner side of the arrayed waveguide 101. Thus, when the light is incident on the output-side slab waveguide 103, an inclination of a fan-shaped equiphase surface caused by a shape of the slab waveguide changes depending on the wavelength. Thus, the light is condensed (optically coupled) on the different output waveguide 105 corresponding to each wavelength. As a result, the arrayed waveguide grating can branch (demultiplex) the wavelength-multiplexed light for each wavelength.

Figure 3:
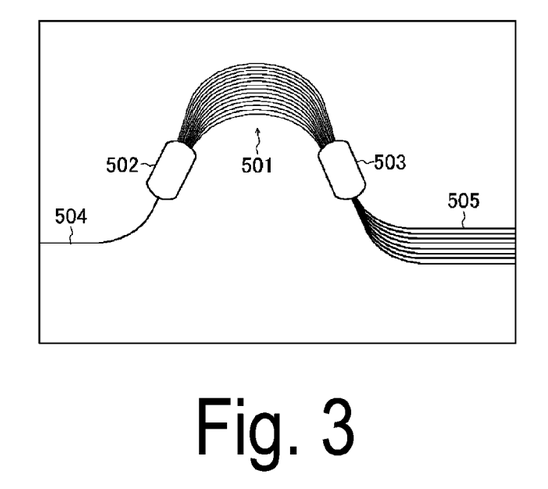
FIG. 3 is a configuration diagram illustrating a configuration of a typical arrayed waveguide grating.

In a commonly used arrayed waveguide grating, an arrayed waveguide 501 is bent at one place like an arc in a plan view, as illustrated in FIG. 3. In FIG. 3, a reference sign 502 denotes an input-side slab waveguide, a reference sign 503 denotes an output-side slab waveguide, a reference sign 504 denotes an input waveguide, and a reference sign 505 denotes an output waveguide. On the other hand, in the arrayed waveguide grating according to the embodiment, the arrayed waveguide 101 is bent at a plurality of places in a plan view and has a shape resembling the wings of a seagull in a plan view. This point will be described below.

Hereinafter, an optical path length of each of the waveguides constituting the arrayed waveguide 101 of the arrayed waveguide grating according to the embodiment will be described in detail. When the optical path length difference between the adjacent waveguides in the arrayed waveguide 101 is ΔL, a central wavelength $\lambda_o$ of the arrayed waveguide grating is expressed by Equation (1) below. The central wavelength $\lambda_o$ is normally a central transmission wavelength of a central port among output ports of the arrayed waveguide grating. In Equation (1), $n_c$ represents an effective refractive index of the arrayed waveguide, and m represents a diffraction order.

In this example, it is assumed that an output end of the output waveguide 105 of the uppermost stage from the upper side of the paper of FIG. 1 is a port 1, that an output end of the output waveguide 105 of the second uppermost stage is a port 2, that an output end of the output waveguide 105 of the third uppermost stage is a port 3, that an output end of the output waveguide 105 of the fourth uppermost stage is a port 4, that an output end of the output waveguide 105 of the fifth uppermost stage is a port 5, that an output end of the output waveguide 105 of the sixth uppermost stage is a port 6, that an output end of the output waveguide 105 of the seventh uppermost stage is a port 7, and that an output end of the output waveguide 105 of the eighth uppermost stage is a port 8.

[Math. 1]

$$\lambda_0 = \frac{n_c \Delta L}{m} \quad (1)$$

A free spectral range (FSR) of the arrayed waveguide grating is expressed by Equation (2) below.

[Math. 2]

$$FSR \cong \frac{\lambda_0}{m} \quad (2)$$

See Non Patent Literature 2 for Equations (1) and (2).

For example, when the free spectral range (FSR) of the arrayed waveguide grating is set to 400 nm or more from a wavelength of 1250 nm to a wavelength of 1650 nm, the central wavelength $\lambda_o$ is set to 1450 nm, the wavelength interval is set to 50 nm, and the output waveguides 105 are designed as eight output waveguides, an entire wavelength range of the access type PON system described above is covered. In this case, the central wavelength of FSR is 1450 nm. Thus, the diffraction order m is set to any one of 1 to 3 in view of Equation (2).

Here, the optical path length difference ΔL becomes a minute length on the order of μm in view of Equation (1), which cannot be achieved by an arc structure in which the arrayed waveguide 101 is bent at only one place. Thus, in the embodiment, the arrayed waveguide 101 has a structure in which the arrayed waveguide 101 is bent at a plurality of places in a central portion and portions on both sides (both side portions) in a plan view. Thus, by providing the plurality of bent places, it is possible to reverse a change in the optical path length from the upper side of the paper surface of FIG. 1 (the outer side) to the lower side of the paper surface of FIG. 1 (the inner side) at different bent portions of the arrayed waveguide 101.

For example, the arrayed waveguide 101 is bent to be convex outward in a plan view at the central portion, and is bent to be convex inward in a plan view at both side portions sandwiching the central portion. With this configuration, in the central portion of the arrayed waveguide 101, the optical path length becomes longer toward the outside (the upper side of the paper surface of FIG. 1), and the optical path length becomes shorter toward the outside at both side portions. The optical path length difference between the adjacent waveguides in the central portion of the arrayed waveguide 101 and the adjacent optical path length difference in both side portions are set to different values, and a change in optical path length in the central portion and a change in optical path length in both side portions are offset to some extent, so that a minute optical path length difference in the entire arrayed waveguide 101 can be set. A detailed design of the optical path length difference described above is described in Patent Literature 1.

Figure 4:
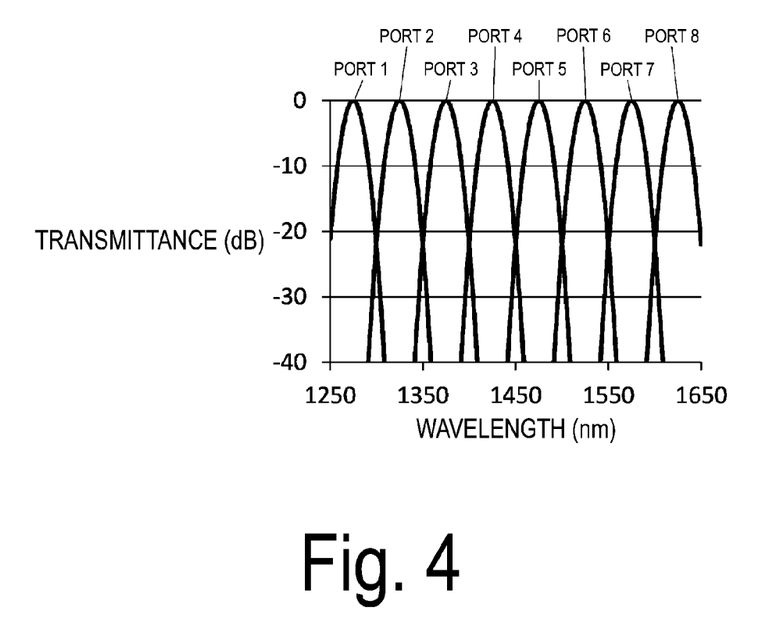
FIG. 4 is a characteristic diagram illustrating an example of a result of calculation of a transmission spectrum of an arrayed waveguide grating.

A function of a transmission spectrum of the arrayed waveguide grating is represented by a Gaussian function. An example of a calculation result is illustrated in FIG. 4. A central transmission wavelength of the output port 1 is 1275 nm. A central transmission wavelength of the output port 2 is 1325 nm. A central transmission wavelength of the output port 3 is 1375 nm. A central transmission wavelength of the output port 4 is 1425 nm. A central transmission wavelength of the output port 5 is 1475 nm. A central transmission wavelength of the output port 6 is 1525 nm. A central transmission wavelength of the output port 7 is 1575 nm. A central transmission wavelength of the output port 8 is 1625 nm.

The function of the transmission spectrum will be described. A transmission function of the arrayed waveguide grating can be expressed by Equation (3) when a loss is ignored (see Non Patent Literature 3).

[Math. 3]

$$T(\delta f) = \exp\left\{-\left(\frac{\Delta x \delta f}{\omega_0 \Delta f}\right)^2\right\} \quad (3)$$

In Equation (3), $\delta f$ is a deviation from a central transmission frequency, $\Delta x$ is an interval between center positions of the output waveguides 105 connected to the output-side slab waveguide 103, $\Delta f$ is an interval between central frequencies of adjacent channels, and $\omega_o$ is a spot size.

Here, when $\delta\lambda$ is a deviation from a central transmission wavelength and $\Delta\lambda$ is an interval between central wavelengths of the adjacent channels, Equation (4) below is established, and when Equation (4) is substituted into Equation (3), Equation (5) is obtained. Equation (3) represented in a frequency domain is represented in a wavelength domain by Equation (5).

[Math. 4]

$$\frac{\delta\lambda}{\Delta\lambda} = \frac{\delta f}{\Delta f} \quad (4)$$

$$T(\delta\lambda) \cong \exp\left\{-\left(\frac{\Delta x \delta f}{\omega_0 \Delta\lambda}\right)^2\right\} \quad (5)$$

FIG. 4 illustrates a result of a transmission spectrum of each channel of the arrayed waveguide grating calculated using Equation (5). A parameter $\Delta x/\omega_o$ representing steepness of the Gaussian function can be adjusted at the time of design of the arrayed waveguide grating, and this parameter $\Delta x/\omega_o$ is set to 4.5 in the embodiment.

Incidentally, because a wavelength region is as wide as 1250 nm to 1650 nm, there is, for example, a loss at about 1380 nm in the arrayed waveguide grating of such a design due to absorption by OH groups in silica glass constituting the waveguide. However, because this wavelength band is not used for transfer, the wavelength band does not affect operation characteristics of the arrayed waveguide diffraction grating. A result illustrated in FIG. 4 is not calculated with a calculation regarding the absorption by the OH groups in the silica glass constituting the waveguide taken into consideration.

Further, the arrayed waveguide grating described above has a channel interval of 50 nm, and a temperature dependence of a demultiplexed wavelength of an interference type filter using a silica-based waveguide is 0.01 nm/° C. Even when a use environment temperature changes by 40° C. between an indoor area and an outdoor area from −5° C. to 35° C., a wavelength variation corresponds to about 0.4 nm due to the temperature dependence described above, which is equal to or smaller than 1/100 of the interval between the adjacent channels, and there is no influence on demultiplexing characteristics. Thus, when the arrayed waveguide grating described above is actually used, it is not necessary to perform temperature control using a Peltier element or the like.

Further, in the case of a silica-based waveguide, a TE/TM polarization dependence of the transmission spectrum is about 0.1 to 0.2 nm, but because the adjacent channel interval, which is equal to a resolution, is as great as 50 nm in the present arrayed waveguide grating, the polarization dependence can be ignored.

Figure 5:
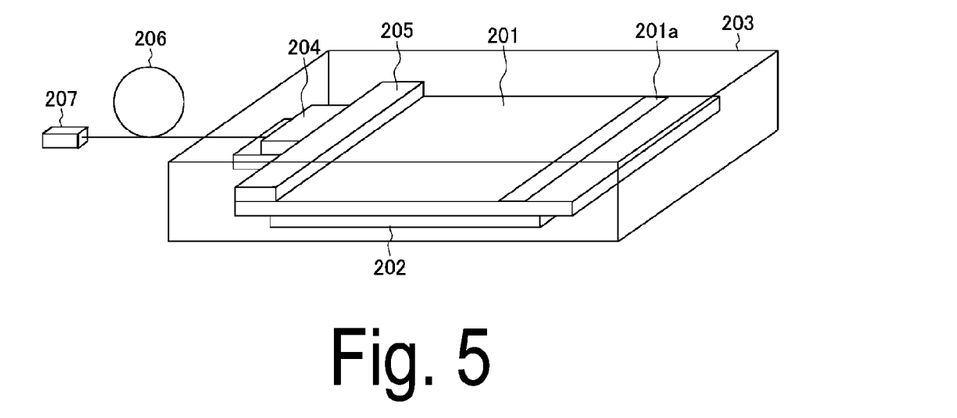
FIG. 5 is a perspective view illustrating a configuration of a measurement module using the wavelength checker according to the first embodiment.

Next, a measurement module using the wavelength checker according to the first embodiment will be described with reference to FIG. 5. In this measurement module, a chip 201 in which the wavelength checker of the first embodiment described above has been formed is mounted on an aluminum substrate 202 and housed in a container 203. An optical conversion unit 201a made of a conversion material that converts near-infrared light to visible light is provided in an output port of the output waveguide of the chip 201. Further, a fiber block 204 is connected to an input waveguide end of the chip 201. Because the chip 201 is thinner than the fiber block 204, a spacer plate 205 made of glass is provided in an end portion of the chip 201 in order to connect the chip 201 to the fiber block 204 thicker than the chip 201.

An optical fiber 206 provided with a connector 207 for inputting an optical signal to be checked is connected to the fiber block 204. An optical fiber with a connector (not illustrated) is separately used for alignment of the fiber block 204 and an input waveguide of the chip 201.

When a cable through which a signal of the PON system to be measured is coming is connected to the connector 207 of the measurement module described above, divided signal light is distributed to the output port of each output waveguide 105 according to an input signal wavelength, and visible light is generated in a portion of the output port that the signal light has reached in the optical conversion unit 201a. The near-infrared signal light reaching the optical conversion unit 201a travels mainly in the waveguiding direction, whereas the visible light resulting from the conversion isotropically spreads due to scattering or spontaneous emission, in addition to components traveling in the same direction as that of the signal light. Thus, the visible light generated in the optical conversion unit 201a can be checked from the outside of the measurement module, and a light emitting place can also be checked. When the output ports are spaced at intervals of 1 mm or more, a place at which light emission is visually checked can be identified at each output port. Because the output port and the wavelength correspond to each other, it is possible to determine the wavelength visually.

Next, manufacturing of the optical conversion unit 201a according to the first embodiment will be described with reference to FIGS. 6A to 6F.

Figure 6A:
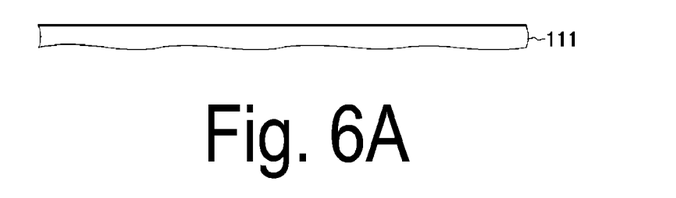
FIG. 6A is a cross-sectional view of the wavelength checker illustrating an intermediate state to explain a method of manufacturing the wavelength checker according to the first embodiment of the present invention.
Figure 6B:
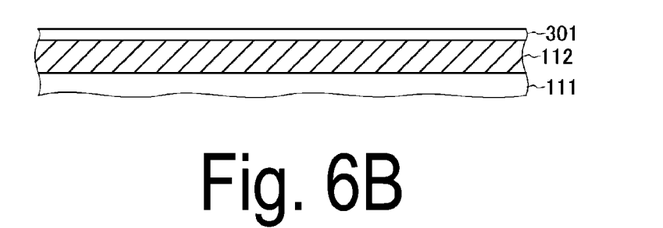
FIG. 6B is a cross-sectional view of the wavelength checker illustrating an intermediate state to explain the method of manufacturing the wavelength checker according to the first embodiment of the present invention.

First, the substrate 111 made of Si is prepared, as illustrated in FIG. 6A. Then, the lower cladding layer 112 is formed on the substrate 111, and a core forming layer 301 is formed on the lower cladding layer 112, as illustrated in FIG. 6B.

For example, the lower cladding layer 112 and the core forming layer 301 can be formed using a flame hydrolysis deposition (FHD) method. First, glass fine particles heated and hydrolyzed through raw material gas, which is mainly composed of silicon tetrachloride, in an oxyhydrogen flame are deposited on the substrate 111, thereby forming a first fine particle layer serving as the lower cladding layer 112. Subsequently, a composition of the raw material gas is changed (a $GeO_2$ dopant concentration is changed), and thus glass particles having different compositions are deposited on the first fine particle layer, thereby forming a second fine particle layer serving as the core forming layer 301. Thereafter, for example, the first fine particle layer and the second fine particle layer are heated using an electrical furnace or the like, so that the respective layers are formed as transparent glass composition films. Thus, the lower cladding layer 112 and the core forming layer 301 are formed. These layers can also be formed using a chemical vapor deposition method.

Figure 6C:
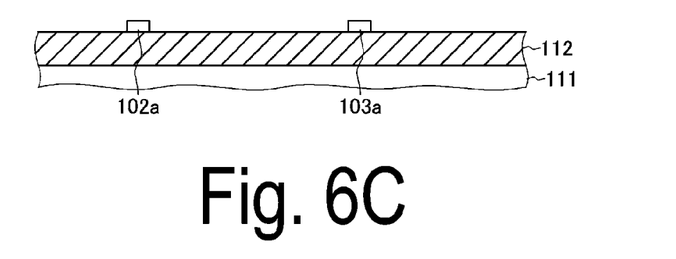
FIG. 6C is a cross-sectional view of the wavelength checker illustrating an intermediate state to explain the method of manufacturing the wavelength checker according to the first embodiment of the present invention.

Then, the core forming layer 301 is patterned using a known lithography technique and etching technique used for manufacture of a semiconductor device, thereby forming a core portion 102a constituting the input-side slab waveguide, and a core portion 103a constituting the output-side slab waveguide, as illustrated in FIG. 6C. Although not illustrated, core portions constituting the arrayed waveguide, the input waveguide, and the output waveguide are also formed at the same time. For example, a resist pattern is formed on the core forming layer 301 on a portion serving as each core portion using a photolithography technique. Next, the core forming layer 301 is etched by reactive ion etching (RIE) using the formed resist pattern as a mask, and thus the portion serving as each core portion is left with the other portions of the core forming layer removed. Thereafter, when the resist pattern is removed, each core portion can be formed.

Figure 6D:
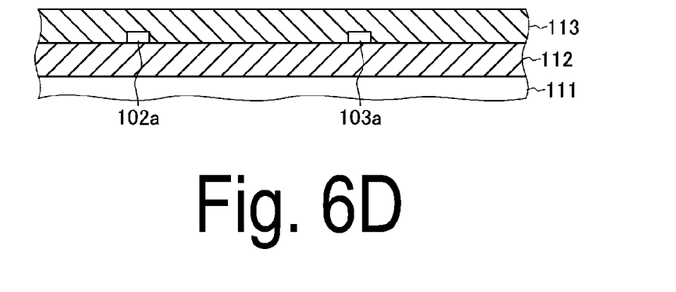
FIG. 6D is a cross-sectional view of the wavelength checker illustrating an intermediate state to explain the method of manufacturing the wavelength checker according to the first embodiment of the present invention.

The upper cladding layer 113 is formed on the core portions 102a and 103a, as illustrated in FIG. 6D. The upper cladding layer 113 can be formed using an FHD method, similar to the lower cladding layer 112 described above.

Figure 6E:
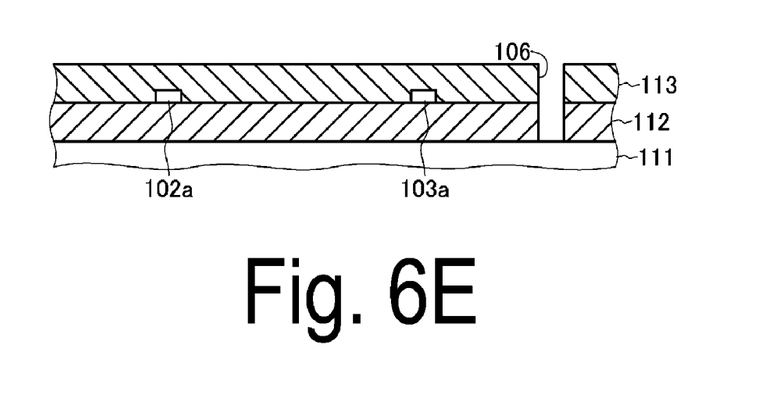
FIG. 6E is a cross-sectional view of the wavelength checker illustrating an intermediate state to explain the method of manufacturing the wavelength checker according to the first embodiment of the present invention.
Figure 6F:
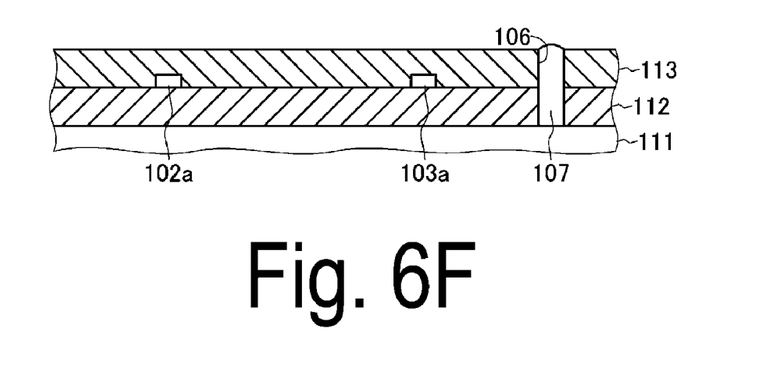
FIG. 6F is a cross-sectional view of the wavelength checker illustrating an intermediate state to explain the method of manufacturing the wavelength checker according to the first embodiment of the present invention.

Then, the upper cladding layer 113 and the lower cladding layer 112 are patterned using a known lithographic technique and etching technique, so that the groove 106 penetrating the upper cladding layer 113 and the lower cladding layer 112 and reaching the substrate 111 is formed as illustrated in FIG. 6E. For example, a resist pattern having an opening at a place at which the groove 106 is formed is formed on the upper cladding layer 113 by photolithography. Then, the upper cladding layer 113 and the lower cladding layer 112 are etched by RIE using the formed resist pattern as a mask to remove a portion serving as the groove 106. Then, when the resist pattern is removed, the groove 106 can be formed. The groove 106 is then filled with a conversion material that converts near-infrared light to visible light, thereby forming the optical conversion unit 107 as illustrated in FIG. 6F.

The light passing through the silica-based waveguide is mainly confined in the core portion and propagates due to a difference in refractive index between the core portion and the cladding portion. A relative refractive index difference between the core portion and the cladding portion made of a silica-based glass is between about 0.3% and about 10%. In general, as a relative refractive index difference increases, a waveguide loss due to bending does not occur even when a bending radius of the waveguide is reduced, allowing the bending radius of the waveguide to be reduced. This enables downsizing of the arrayed waveguide grating, thereby enabling downsizing of the wavelength checker.

However, when the relative refractive index difference is increased, a mode field diameter of the waveguide becomes smaller in order to maintain a single mode condition or a pseudo single mode condition of the waveguide. Thus, in an optical connection between a waveguide having a small mode field diameter and an optical fiber, it is important to dispose a spot size converter or the like in a connection portion in order to prevent a connection loss.

Second Embodiment

Figure 7:
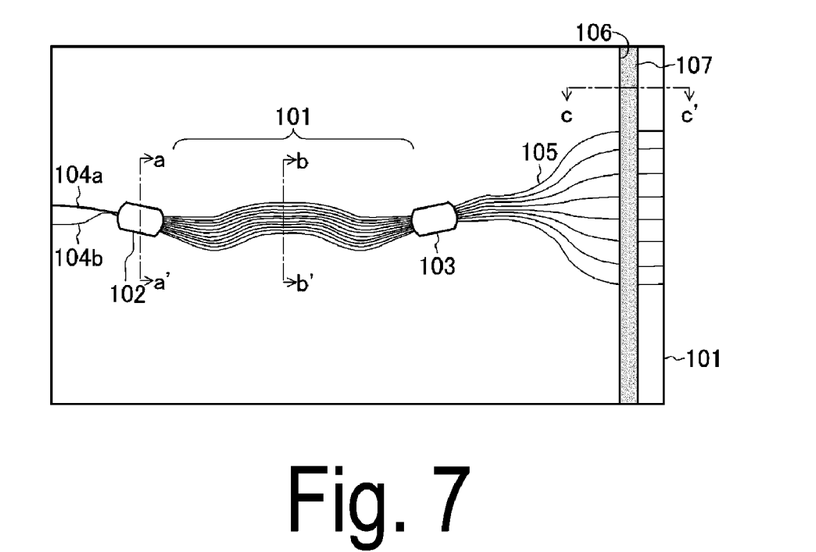
FIG. 7 is a configuration diagram illustrating a configuration of a wavelength checker according to a second embodiment of the present invention.

Next, a wavelength checker according to a second embodiment of the present invention will be described with reference to FIG. 7. The wavelength checker includes an arrayed waveguide 101, an input-side slab waveguide 102, an output-side slab waveguide 103, and an output waveguide 105. Further, this wavelength checker also includes a groove 106 and an optical conversion unit 107. Configurations of these are the same as those of the first embodiment described above, and detailed description thereof will be omitted.

In the wavelength checker according to the second embodiment, a first input waveguide 104a and a second input waveguide 104b are connected to an input side of the input-side slab waveguide 102. When a waveguide interval in a connection portion of the plurality of output waveguides 105 with the output-side slab waveguide 103 is $\Delta x_{out}$, a waveguide interval between a connection portion of the first input waveguide 104a with the input-side slab waveguide 102 and a connection portion of the second input waveguide 104b with the input-side slab waveguide 102 is $\Delta x_{out}/2$. Further, in the input-side slab waveguide 102, the arrayed waveguide 101, and the output-side slab waveguide 103 of the second embodiment, a shape in a plan view is line-symmetrical with respect to a straight line that passes through a midpoint of a line segment connecting a center of the input-side slab waveguide 102 to a center of the output-side slab waveguide 103 and that is perpendicular to the line segment. In the input-side slab waveguide 102, an arc in contact with the input waveguide and an arc in contact with the arrayed waveguide have the same curvature. Thus, the center of the input-side slab waveguide is an intersection of straight lines diagonally connecting four points at which straight lines and arcs constituting an outer shape of the slab waveguide intersect with each other. The same applies to the output-side slab waveguide 103.

Hereinafter, more details will be described.

Figure 8A:
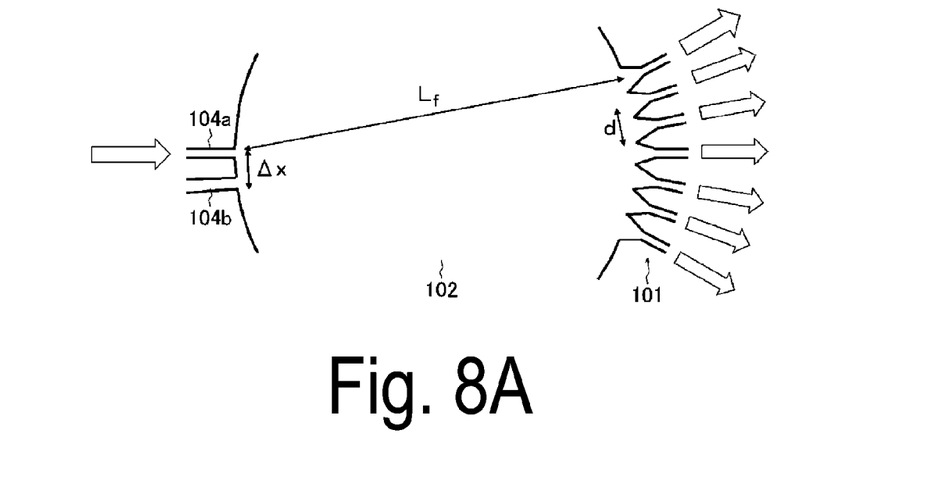
FIG. 8A is a plane illustrating a partial configuration of the wavelength checker according to the second embodiment of the present invention.
Figure 8B:
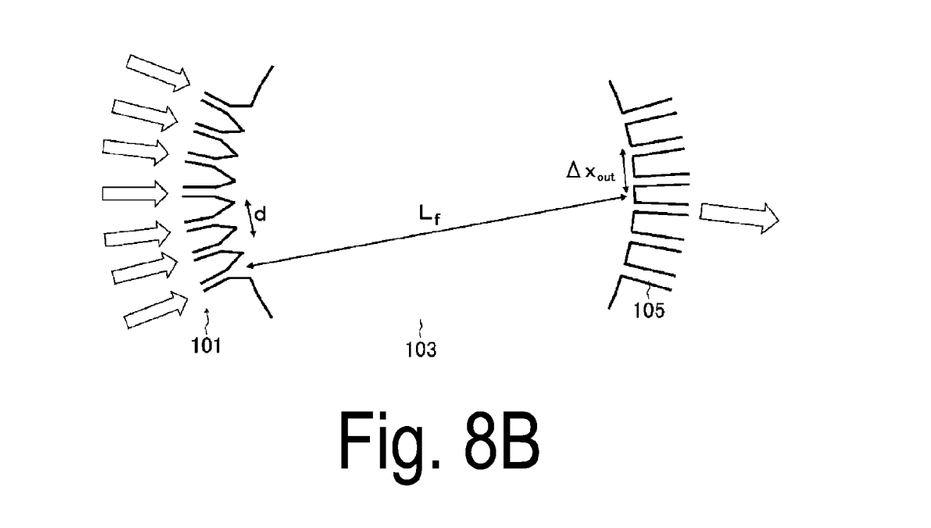
FIG. 8B is a plane illustrating a partial configuration of the wavelength checker according to the second embodiment of the present invention.

The first input waveguide 104a is connected to the center of the input-side slab waveguide 102. Further, it is assumed that the respective output waveguides 105 are connected to the center of the output-side slab waveguide 103 at waveguide intervals of $\Delta x_{out}$, and that light is branched into light beams having equally spaced central transmission wavelength of $\lambda 1$, $\lambda 2$, $\lambda 3$, . . . , and $\lambda 8$ with respect to the respective output waveguides 105. Further, the second input waveguide 104b is connected to the input-side slab waveguide 102 at a waveguide interval of $\Delta x$, which is equal to $\Delta x_{out}$, with respect to the first input waveguide 104a (see FIGS. 8A and 8B).

As described above, when the shape in a plan view of the input-side slab waveguide 102, the arrayed waveguide 101, and the output-side slab waveguide 103 are line-symmetrical (see Non Patent Literature 2), the following is satisfied.

When the second input waveguide 104b is connected, being shifted with respect to the first input waveguide 104a, the wavelength-multiplexed light input to the second input waveguide 104b is branched into light beams having equally spaced central transmission wavelengths of $\lambda 2$, $\lambda 3$, $\lambda 4$, . . . , and $\lambda 9$ with respect to the respective output waveguides 105. This is because the second input waveguide 104b is shifted by one waveguide interval, and thus a wavefront when the light reaches the arrayed waveguide 101 is inclined. As a result, a wavefront when the light reaches the output waveguides 105 is inclined, and the light having the same wavelength is condensed on the output waveguide 105 shifted by one waveguide interval.

When the waveguide interval $\Delta x$ between the first input waveguide 104a and the second input waveguide 104b is $\Delta x_{out}/2$, a central wavelength interval between adjacent channels is $\Delta \lambda$ and the central transmission wavelengths become $\lambda 1+\Delta\lambda/2$, $\lambda 2+\Delta\lambda/2$, $\lambda 3+\Delta\lambda/2$, . . . , and $\lambda 8+\Delta\lambda/2$. $\Delta\lambda=\lambda 2-\lambda 1=\lambda 3-\lambda 2=$ . . . $=\lambda 9-\lambda 8$.

Figure 9A:
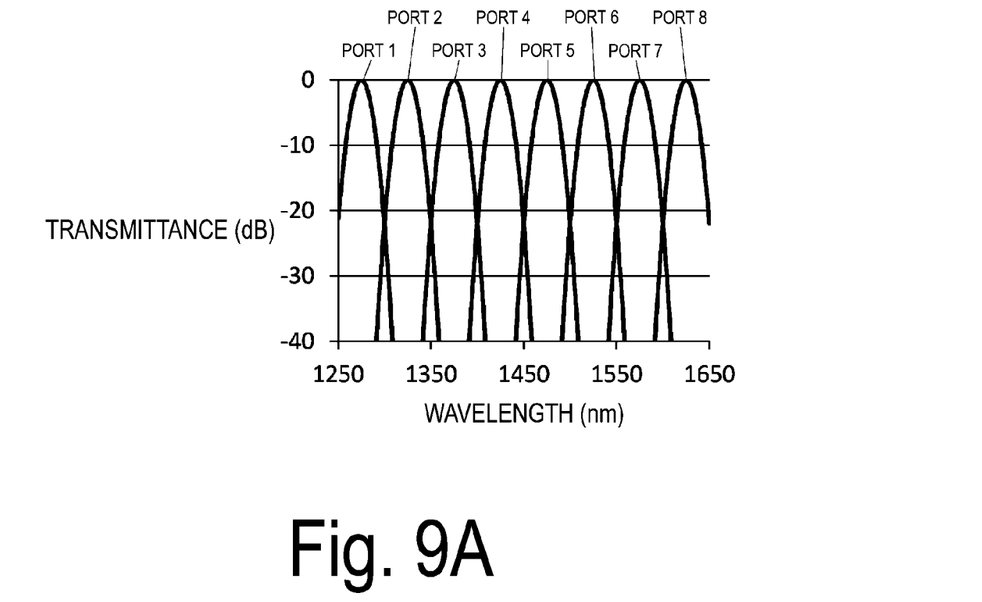
FIG. 9A is a characteristic diagram illustrating an example of a result of calculation of a transmission spectrum of an arrayed waveguide grating.

A design of the arrayed waveguide grating in the second embodiment is the same as that in the first embodiment. In this case, a spectrum (a calculated value) input from the first input waveguide 104a and transmitted through the arrayed waveguide grating is the same spectrum as the transmission spectrum in the first embodiment, as illustrated in FIG. 9A. That is, the central transmission wavelengths of the output waveguides 105 are 1275 nm, 1325 nm, 1375 nm, 1425 nm, 1475 nm, 1525 nm, 1575 nm, and 1625 nm.

Figure 9B:
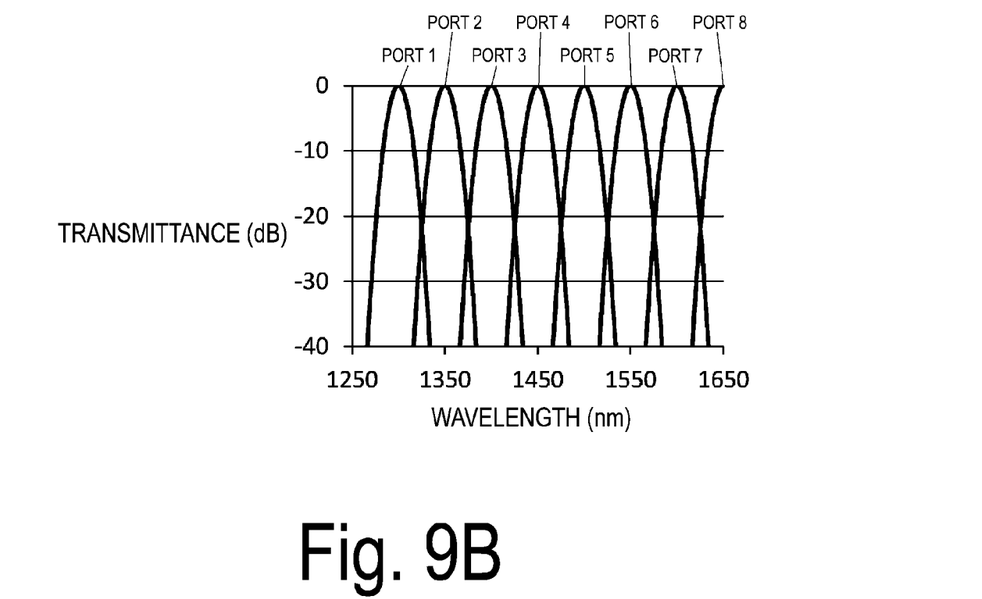
FIG. 9B is a characteristic diagram illustrating an example of a result of calculation of a transmission spectrum of the arrayed waveguide grating.

On the other hand, a spectrum (a calculated value) input from the second input waveguide 104b and transmitted through the arrayed waveguide grating is shifted by half the wavelength interval as illustrated in FIG. 9B, and becomes 1300 nm, 1350 nm, 1400 nm, 1450 nm, 1500 nm, 1550 nm, 1600 nm, and 1650 nm. That is, the transmission spectrum from the first input waveguide 104a and the spectrum from the second input waveguide 104b differ from each other.

As compared with the case in which there is one input waveguide to the arrayed waveguide grating, effects of providing the first input waveguide 104a and the second input waveguide 104b are as follows. When the number of input waveguides is one and light having a wavelength between transmission spectrum peaks of the adjacent output waveguides 105 is input, transmittance is low, and thus light converted from near-infrared light to visible light also becomes weak, so that the light emission in the optical conversion unit 107 cannot be recognized in some cases.

For example, the transmitted light intensities at ports 1 and 2 at a wavelength of 1300 nm in FIG. 9A deteriorate by 20 dB, as compared with the most transmission wavelengths (1275 nm or 1325 nm).

Figure 10:
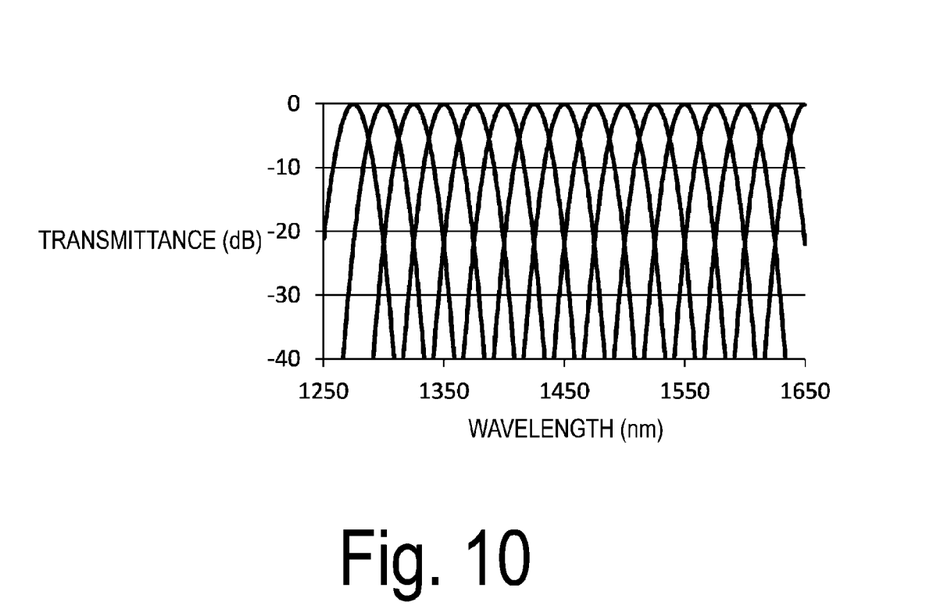
FIG. 10 is a characteristic diagram illustrating an example of a result of calculation of a transmission spectrum of the arrayed waveguide grating.

On the other hand, when the first input waveguide 104a and the second input waveguide 104b are used, signal light is also input to the second input waveguide 104b, so that the transmitted light intensity at port 1 at the wavelength of 1300 nm is the most transmissive wavelength. Consequently, as illustrated in FIG. 10 in which FIGS. 9A and 9B are overlapped, it can be seen that use of the first input waveguide 104a and the second input waveguide 104b yields deterioration of only 5 dB even at the least transmission wavelength as compared with the maximum transmission wavelength (excluding a wavelength of about 1250 nm).

Thus, there is a case in which signal light is input to one input waveguide, but transmitted light intensity with respect to the signal light is weak, and thus a wavelength cannot be recognized. By using the first input waveguide 104a and the second input waveguide 104b and inputting signal light to both waveguides, stronger light emission can be obtained in the optical conversion unit 107, thereby enabling more reliable wavelength recognition.

Figure 11:
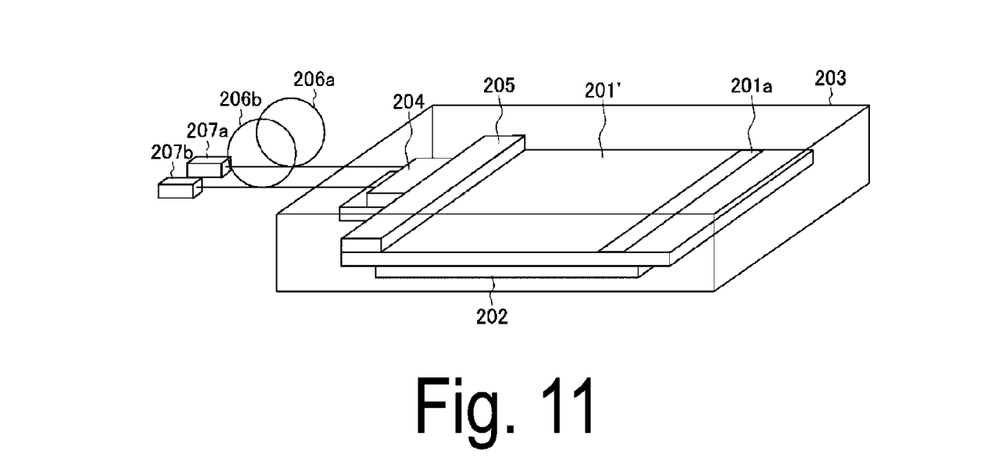
FIG. 11 is a perspective view illustrating a configuration of a measurement module using the wavelength checker according to the second embodiment.

Next, a measurement module using the wavelength checker according to the second embodiment will be described with reference to FIG. 11. In this measurement module, a chip 201' in which the wavelength checker of the second embodiment described above has been formed is mounted on an aluminum substrate 202 and housed in a container 203. An optical conversion unit 201a made of a conversion material that converts near-infrared light to visible light is provided in an output port of the output waveguide of the chip 201'. Further, a fiber block 204 is connected to an input waveguide end of the chip 201'. Because the chip 201' is thin, a spacer plate 205 made of glass is provided in an end portion of the chip 201' in order to connect the chip 201' to the fiber block 204 thicker than the chip 201'.

An optical fiber 206a provided with a connector 207a and an optical fiber 206b provided with a connector 207b, which are for inputting an optical signal to be checked, are connected to the fiber block 204. An optical fiber with a connector (not illustrated) is separately used for alignment of the fiber block 204 and an input waveguide of the chip 201.

As described above, according to embodiments of the present invention, because the groove extending in the direction crossing the plurality of output waveguides is provided, and the optical conversion unit made of the conversion material that converts the near-infrared light to the visible light is formed such that the groove is filled with the optical conversion unit, it is possible to easily check for example whether there is signal light in opening, failure isolation investigation, or the like of a PON system.

The present invention is not limited to the embodiments described above, and it is obvious that many modifications and combinations can be implemented by a person having ordinary knowledge in the field within the technical spirit of the present invention.

REFERENCE SIGNS LIST

101 Arrayed waveguide
102 Input-side slab waveguide

103 Output-side slab waveguide
104 Input waveguide
105 Output waveguide
106 Groove
107 Optical conversion unit.

The invention claimed is:

1. A wavelength checker comprising:
an arrayed waveguide including a plurality of waveguides on a substrate, each of the plurality of waveguides including a cladding portion and a core, the plurality of waveguides including a plurality of first waveguides having a constant optical path length difference;
an input-side slab waveguide on the substrate and connected to an optical input end of the arrayed waveguide;
an output-side slab waveguide on the substrate and connected to an optical output end of the arrayed waveguide;
an input waveguide on the substrate and connected to an input side of the input-side slab waveguide;
a plurality of output waveguides on the substrate and connected to an output side of the output-side slab waveguide;
a groove extending in a direction crossing the plurality of output waveguides, the groove being disposed in cladding portions of the plurality of output waveguides; and
an optical converter made of a conversion material that converts near-infrared light to visible light, the groove being filled with the optical converter.

2. The wavelength checker according to claim 1, wherein the input-side slab waveguide, the arrayed waveguide, and the output-side slab waveguide are arranged so that a shape in a plan view is line-symmetrical with respect to a straight line that passes through a midpoint of a line segment connecting a center of the input-side slab waveguide to a center of the output-side slab waveguide, and wherein the straight line is perpendicular to the line segment.

3. The wavelength checker according to claim 2, wherein:
the input waveguide includes a first input waveguide and a second input waveguide, and
when a waveguide interval in a connection portion of the plurality of output waveguides with the output-side slab waveguide is $\Delta x_{out}$, a waveguide interval between a connection portion of the first input waveguide with the input-side slab waveguide and a connection portion of the second input waveguide with the input-side slab waveguide is $\Delta x_{out}/2$.

4. The wavelength checker according to claim 1, wherein the conversion material is a phosphor substance that converts near-infrared light to visible light.

5. The wavelength checker according to claim 1, wherein the conversion material is a fluorescent substance that converts near-infrared light to visible light.

6. A wavelength checker comprising:
an arrayed waveguide including a plurality of waveguides on a substrate;
an output-side slab waveguide on the substrate and connected to an optical output end of the arrayed waveguide;
a plurality of output waveguides on the substrate and connected to an output side of the output-side slab waveguide;
a groove extending in a direction across the plurality of output waveguides, the groove being disposed in first cladding portions of the plurality of output waveguides; and
an optical converter made of a conversion material that converts near-infrared light to visible light, the optical converter being disposed in the groove.

7. The wavelength checker according to claim 6, wherein each of the plurality of waveguides including a second cladding portion and a core.

8. The wavelength checker according to claim 6, wherein the plurality of waveguides each have a constant optical path length difference.

9. The wavelength checker according to claim 6 further comprising:
an input-side slab waveguide on the substrate and connected to an optical input end of the arrayed waveguide; and
an input waveguide on the substrate and connected to an input side of the input-side slab waveguide.

10. The wavelength checker according to claim 9, wherein the input-side slab waveguide, the arrayed waveguide, and the output-side slab waveguide are arranged so that a shape in a plan view is line-symmetrical with respect to a straight line that passes through a midpoint of a line segment connecting a center of the input-side slab waveguide to a center of the output-side slab waveguide, and wherein the straight line is perpendicular to the line segment.

11. The wavelength checker according to claim 10, wherein:
the input waveguide includes a first input waveguide and a second input waveguide, and
when a waveguide interval in a connection portion of the plurality of output waveguides with the output-side slab waveguide is $\Delta x_{out}$, a waveguide interval between a connection portion of the first input waveguide with the input-side slab waveguide and a connection portion of the second input waveguide with the input-side slab waveguide is $\Delta x_{out}/2$.

12. The wavelength checker according to claim 6, wherein the conversion material is a phosphor substance or a fluorescent substance that converts near-infrared light to visible light.

13. A method comprising:
forming an arrayed waveguide including a plurality of waveguides on a substrate, each of the plurality of waveguides including a cladding portion and a core, the plurality of waveguides having a constant optical path length difference;
forming an input-side slab waveguide on the substrate and connected to an optical input end of the arrayed waveguide;
forming an output-side slab waveguide on the substrate and connected to an optical output end of the arrayed waveguide;
forming an input waveguide on the substrate and connected to an input side of the input-side slab waveguide;
forming a plurality of output waveguides on the substrate and connected to an output side of the output-side slab waveguide;
forming a groove extending in a direction crossing the plurality of output waveguides, the groove being disposed in cladding portions of the plurality of output waveguides; and
filling the groove with an optical converter made of a conversion material that converts near-infrared light to visible light.

14. The method according to claim 13, wherein the input-side slab waveguide, the arrayed waveguide, and the output-side slab waveguide are arranged so that a shape in a plan view is line-symmetrical with respect to a straight line that passes through a midpoint of a line segment connecting a center of the input-side slab waveguide to a center of the output-side slab waveguide, and wherein the straight line is perpendicular to the line segment.

15. The method according to claim 14, wherein:
the input waveguide includes a first input waveguide and a second input waveguide, and
when a waveguide interval in a connection portion of the plurality of output waveguides with the output-side slab waveguide is $\Delta x_{out}$, a waveguide interval between a connection portion of the first input waveguide with the input-side slab waveguide and a connection portion of the second input waveguide with the input-side slab waveguide is $\Delta x_{out}/2$.

16. The method according to claim 13, wherein the conversion material is a phosphor substance or a fluorescent substance that converts near-infrared light to visible light.

* * * * *